(No Model.)
E. A. COLLINS.
SEAT FOR BICYCLES.
No. 579,514. Patented Mar. 23, 1897.
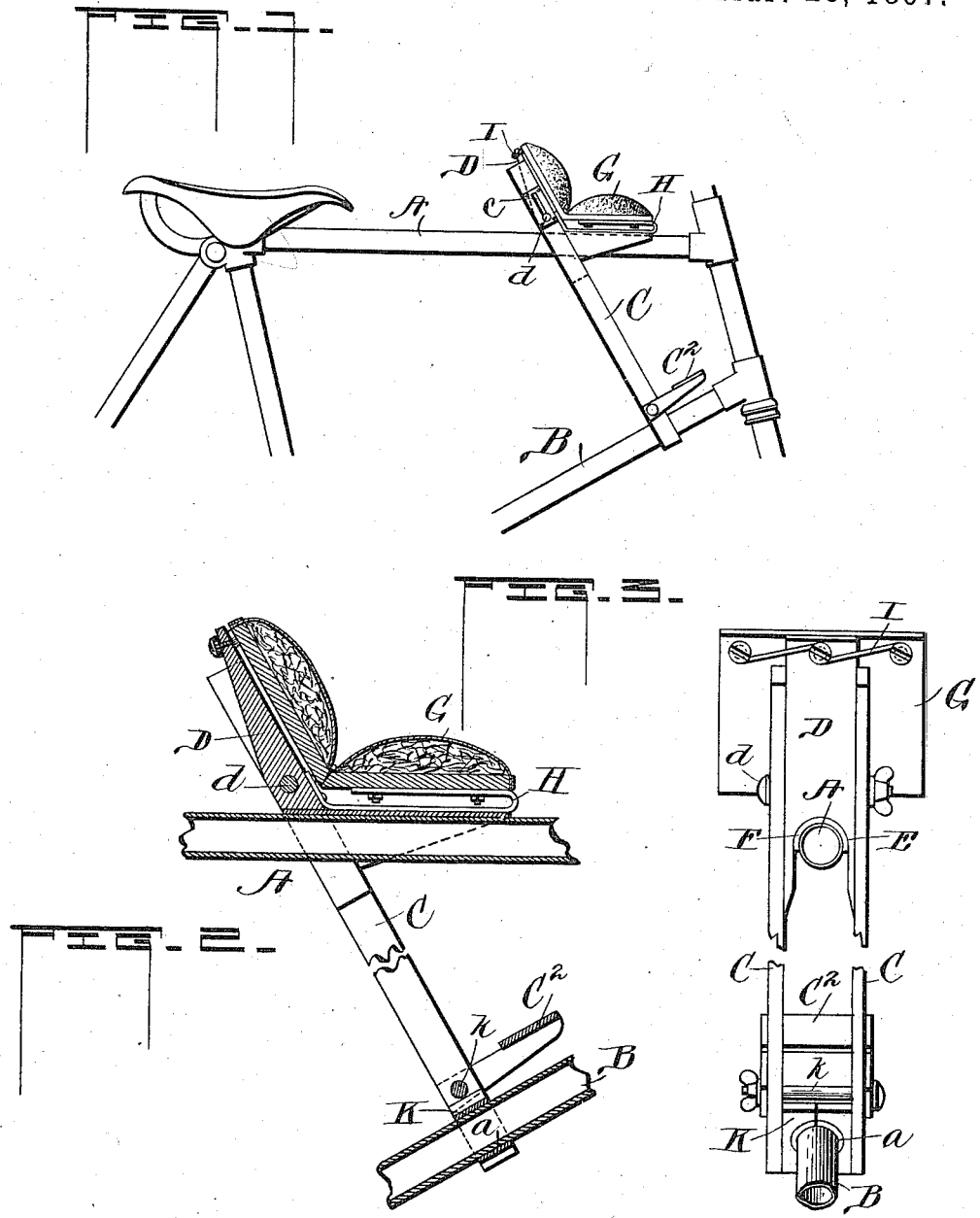
Witnesses:
Chas. V. LaPorte
A. E. Francis
Inventor,
Elbert Adrian Collins
by J. V. Jeffx
Atty.

UNITED STATES PATENT OFFICE.

ELBERT ADRIAN COLLINS, OF CHILLICOTHE, ILLINOIS.

SEAT FOR BICYCLES.

SPECIFICATION forming part of Letters Patent No. 579,514, dated March 23, 1897.

Application filed June 8, 1896. Serial No. 594,684. (No model.)

*To all whom it may concern:*

Be it known that I, ELBERT ADRIAN COLLINS, a citizen of the United States, residing at Chillicothe, in the county of Peoria and State of Illinois, have invented certain new and useful Improvements in Children's Seats for Bicycles; and I do hereby declare that the following is a full, clear, and exact description of the invention, which will enable others skilled in the art to which it appertains to make and use the same.

My invention relates to certain new and useful improvements in children's seats for bicycles by means of which a very simple and conveniently-adjusted device is provided for that purpose.

More particularly my invention relates to an adjustable detachable frame, upon which the seat proper is mounted, having connection with and bearing upon the frame part of the bicycle.

I am aware that children's seats for bicycles have been made and patents procured therefor with various means provided for mounting the seat upon the bicycle. I therefore do not claim, broadly, the idea of a child's seat for a bicycle, but simply claim the means I provide for attachment to the frame and the general combination, including the mounting of the seat upon the said frame.

My invention consists of a frame adapted to be clamped upon or secured to the upper horizontal bar of the frame, which usually has a diagonal bearing with relation to the said horizontal bar, a suitable seat connected with the upper portion of the bar or bars, and means for providing an adjustable relation with said bar or bars. A suitable spring-support for the seat may also be provided, and other details of construction may be provided in connection with the bar or bars, as may be desired.

That my invention may be more fully understood, reference is had to the accompanying drawings.

Figure 1 is a side elevation of a portion of a bicycle, showing my device mounted thereon. Fig. 2 is an enlarged vertical section of the same. Fig. 3 is a rear view of a portion of the same.

In the figures, A and B are frame parts of a bicycle.

C C are bars, each being provided with a slot $c$. $C^2$ is a foot-rest supported upon the said bars.

D is an angular block provided with the groove E and is adapted to fit between the bars C C and is supported in position between the said bars by means of a bolt $d$, and the grooved portion E of the block is adapted to rest upon the horizontal cross-bar A, and the pad or shield F may be provided for contact bearing with the frame.

G is a seat, and H is a spring upon which the seat is mounted, the said spring being fixed to the block D, as shown in the drawings, and by the provision of this spring the jar attendant upon rough riding will be obviated.

I is a wire connected with the back of the seat, the wire, however, being so connected with the parts as to permit the upward and downward movement of the seat upon its spring-support.

K is a block interposed between the bars C C at their lower ends and made in sections, each section being provided with circular grooves, which when the sections are brought together are designed to form a clamp for a frame part of a bicycle, the sections being held in place by means of the bolt K, the shield or interior lining $a$ being provided for contact bearing upon the frame part, and these sections are adapted to be moved apart with the bars C C to engage the frame part of a bicycle, then drawn together and clamped thereon. Any suitable means may be provided to facilitate in this clamping of the parts upon the bar, but I have simply used an ordinary bolt and thumb-screw, and any suitable clamp may be provided for the purpose that may be desired.

I do not limit myself in this application for patent to the exact construction of parts shown in the drawings, but may modify them somewhat, but will adhere to the principle of attachment directly with the frame parts of a bicycle.

Having thus fully described my invention, what I claim, and desire to secure by Letters Patent, is—

1. In a child's seat for a bicycle a bar or bars adapted to be secured to and upon the frame parts A and B of a bicycle, a seat adjustably connected with said bars and means for facilitating the ready attachment and detachment of the bar or bars, all substantially as shown and described.

2. In a child's seat for a bicycle, the bars C, C, provided with the clamping-blocks E, E, and the block D and the slots $c, c$, and the seat G mounted upon the spring H, and connected with the bar, all substantially as described and shown.

In testimony whereof I affix my signature in presence of two witnesses.

ELBERT ADRIAN COLLINS.

Witnesses:
E. F. HUNTER,
E. J. COLLINS.